United States Patent [19]

Koy et al.

[11] Patent Number: 4,993,621
[45] Date of Patent: Feb. 19, 1991

[54] METHOD OF PROTECTING CORROSION-SUSCEPTIBLE WALLS AGAINST CORROSION

[75] Inventors: Hermann Koy, Alzenau-Albstadt; Rainer Reuffurth, Offenbach, both of Fed. Rep. of Germany

[73] Assignee: Metallgesellschaft Aktiengesellschaft, Frankfurt am Main, Fed. Rep. of Germany

[21] Appl. No.: 445,381

[22] Filed: Dec. 4, 1989

[30] Foreign Application Priority Data

Dec. 3, 1988 [DE] Fed. Rep. of Germany ....... 3840842

[51] Int. Cl.$^5$ .................. B23K 31/02; B23K 101/18
[52] U.S. Cl. .................. 228/173.6; 228/140; 228/174; 228/175
[58] Field of Search ............ 228/138, 139, 140, 173.6, 228/174, 175; 52/218, 219; 110/203, 336; 29/157.5; 219/98, 99

[56] References Cited

U.S. PATENT DOCUMENTS 2,993,110  7/1961  Godley ........................... 219/99
4,485,960  12/1984  Sagan et al. ................... 228/175

FOREIGN PATENT DOCUMENTS 114268  3/1918  United Kingdom ............... 228/140

OTHER PUBLICATIONS

Metals Handbook, Ninth Edition, vol. 6, "Stud Welding", pp. 729-738, copyright 1983.

*Primary Examiner*—Sam Heinrich
*Attorney, Agent, or Firm*—Herbert Dubno

[57] ABSTRACT

A method of applying corrosion resistant liners to the structural steel walls of flue gas lines, flue gas treating apparatus, scrubbers and the like. The wall to be protected is provided with spaced apart bores and the liner sheets are applied to the inner surface of the structural steel wall. The studs are joined to the sheets by stud welding and the sheets are then drawn tightly against the wall by the application of tensile forces to the studs. The studs are subsequently gas tightly joined to the wall, e.g. by welds. An alternative method of attachment uses a screw thread on the stud and the nut which is threaded onto the stud and bears against a washer and a sealing ring which is pressed against the wall around the stud.

13 Claims, 2 Drawing Sheets

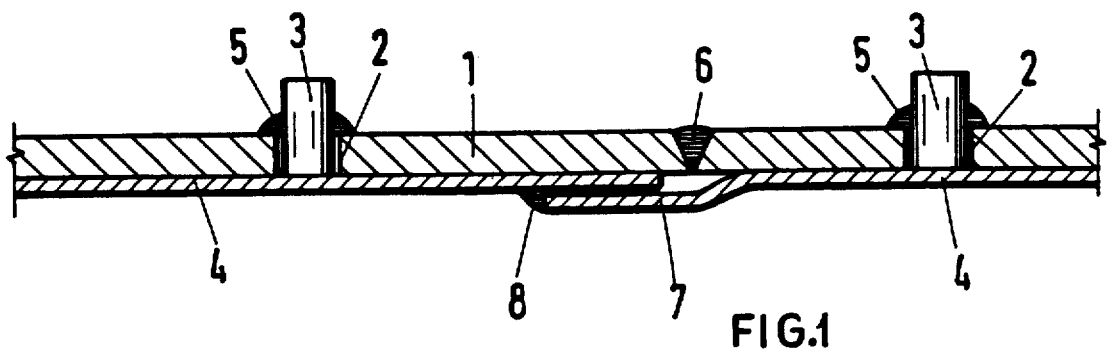
FIG.1
FIG.2a  FIG.2b  FIG.2c  FIG.2d
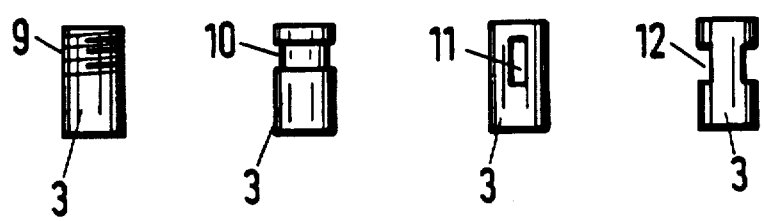
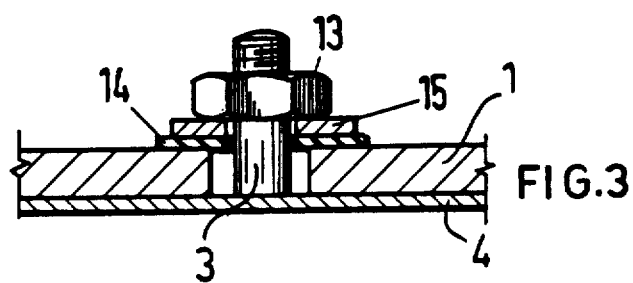
FIG.3

METHOD OF PROTECTING CORROSION-SUSCEPTIBLE WALLS AGAINST CORROSION

FIELD OF THE INVENTION

My present invention relates to a method of protecting corrosion-susceptible walls, e.g. of conventional structural steel and in flue gas ducts, apparatuses used in the cleaning or handling of flue gases, desulfurizers and the like. More particularly, the invention relates to a method of reducing the tendency to corrosion of such apparatus.

BACKGROUND OF THE INVENTION

Exhaust gases from power plant boilers, melting furnaces, chemical factories and the like almost always contain corrosive substances which require special procedures in the design and operation of the plants if corrosion is to be avoided.

For example, the utilization of the heat content of flue gases from power plant boilers is limited by the fact that the temperature must not be lower than the dewpoint temperature in order to avoid corrosion.

That problem has been solved in a relatively simple manner by insuring that the temperature will not drop below a certain point and by selecting an exhaust gas temperature sufficiently above the dewpoint to prevent its lowering below the critical temperature during processing.

Nevertheless, active measures are often required to protect the walls of such apparatus against corrosion in most exhaust gas or flue gas cleaning processes.

This is especially important in the so called wet gas cleaning process regardless of the temperatures employed, because the corrosive substances dissolved in the liquid treating agent tend to attack the structural steel walls of the ducts and vessels. The corrosive substances may derive from the flue gas and are in their most virulent states in solution in scrubbing liquids.

Corrosion is also a problem in the so-called semidry and dry gas cleaning processes. In such systems it is not possible, as a rule, to avoid the corrosion problems simply by the selection of a temperature which is relatively harmless with respect to corrosion.

In semidry processes, the treating agents are introduced in a liquid form into the gas stream and are supposed to entirely evaporate so that only dry reaction products will be obtained.

Obviously, in that case, there is a risk of corrosion in the regions in which the gas stream still contains liquid treating agents or downstream of such regions where the temperature may decrease below the dewpoint if the supply of liquid is not properly controlled or if the flue gases are inadvertently under cooled.

Corrosion problems can also arise in flue gas cleaning using dry systems if the flue gases are cooled below the dewpoint because of economy or some other reasons having to do with process technology.

Faced with the problem that corrosion cannot normally be avoided by selection and maintenance of the process conditions, it is a common practice to provide liners for the structural steel walls to protect them against corrosion when the walls form parts of ducts and vessels in flue gas cleaning apparatus.

For example, the surfaces which are susceptible to corrosion may be coated with rubber or with glass fiber mats and polyester resins.

For both techniques, the substrate, i.e. the structural steel wall, must be very carefully pretreated to insure a complete bond between the coating and the substrate.

As a consequence, application of the corrosion resistant liner is a highly expensive procedure.

Furthermore, both methods or liner types have the serious drawback that the materials which are employed are combustible so that it is not possible to effect subsequent welding operations on parts of the wall sections. In practice, moreover, it has been found that it is not possible, utilizing prior art materials, to obtain a useful life of more than four to five years. That is by no means sufficient for most applications.

It has also been proposed to secure sheets of corrosion resistant steel by the so-called plug welding process to walls consisting of conventional structural steel.

In that technique, holes spaced apart at the desired fixing points are formed in the walls and the sheets are welded to the structural steel of the wall along the periphery of the holes. In other words, deposit welds are formed within the holes between the flanks of the hole and the lining sheet.

That process is relatively expensive and also is frequently rejected because the welding results in a change in composition of the corrosion resistance material of the sheet, e.g. a mixture of corrosion resistant materials and corrodible materials which can render the sheet at the weld point susceptible to corrosion as well.

Indeed, in practice it is observed that a new alloy which does not resist corrosion, is formed adjacent the deposit weld.

As the extent to which the sheet of corrosion resistant steel is melted will depend upon the skill and care of the welder, uniform results do not always occur. It is possible to burn through the sheets and because of compositional changes resulting from welding, which are largely uncontrollable, there is always the danger that the corrosion protection will be limited or no protection will be gained at all in regions adjacent to the weld deposit.

Another process avoids these drawbacks by providing a grid of strips of corrosion resistant steel to the wall and welding sheets of corrosion resistant steel subsequently to that grid. The grid spacing cannot exceed the spacing of the fixing seams and this spacing will depend on the thickness of the sheets of corrosion resistant steel. If the seam spacing is about 0.5 meter, the sheets of corrosion resistance steel must not be larger than 0.25 meter$^2$ and must be secured by seam welds of a length of 2 meters. As a result, a complex and expensive welding process is required, both to secure the sheets to the grid and to secure the grid to the wall and, generally speaking, this more expensive process will not be adopted if another procedure is available.

OBJECTS OF THE INVENTION

It is the principal object of the present invention, therefore, to provide a method of protecting a structural steel wall of a flue gas processing vessel or duct which can overcome the above described drawbacks.

Another object of the invention is to provide a method of applying a corrosion resistant liner on an inside surface of a flue or other gas conducting part in heat transfer apparatus, in gas purification apparatus and the like, whereby disadvantages of earlier systems can be avoided.

Another object is to provide a method of applying a liner which will be of universal utility, can be applied at low cost and will nevertheless be highly durable.

It is another object of the invention to provide a method of making a line structure which allows repair work, including welding, on the gas conducting components and the liner without difficulty.

SUMMARY OF THE INVENTION

These objects and others which will become apparent hereinafter are attained, in accordance with the present invention, in a method which comprises the steps of:

(a) providing a corrosion-susceptible steel wall to be protected against corrosion with a plurality of bores with predetermined distances apart;

(b) applying at least one corrosion-resistant steel sheet against a surface of the corrosion-susceptible steel wall on a side thereof facing a space receiving a corrosive medium;

(c) inserting respective studs in each of the bores from an opposite side of the corrosion-susceptible steel wall into contact with the sheet;

(d) stud-welding each of the studs to the sheet; and (e) securing each of the studs gas tightly to the wall at the opposite side.

According to a feature of the invention, the studs are composed of corrosion resistant steel and, advantageously, the same corrosion resistant steel as the corrosion resistant sheets.

It has been found to be advantageous to provide the studs with free ends which project through the bores or holes and extend beyond the opposite side of the wall. The studs can be provided with the peripheral annular groove at this free end, a central opening, or diametrically opposite recesses in order to receive a tightening tool of appropriate configuration for drawing the liner against the wall.

The studs can have screw threads at their free ends so that nuts can be threaded onto these screw threads and, via the interposition of washers and seals, can lock the studs to the wall in a hermetically sealed manner. In this case, the bores can be somewhat larger in diameter than the studs.

Where the bores are only slightly larger in diameter than the studs, a deposit weld can be formed around the stud sealing any gap between the bore flank and the stud.

The sheets may be overlapping at respective edges and can be welded to each other at the overlap.

Advantageously, 1 to 10 such joints or studs are provided per square meter.

The process of the invention can be used to manufacture prefabricated wall sections in a workshop, the wall sections being assembled at a plant cite to be equipped with the apparatus having the liner of the invention. In this case, the lining sheets can be welded in overlapping relationship as has been mentioned.

BRIEF DESCRIPTION OF THE DRAWING

The above and other objects, features and advantages of my invention will become more readily apparent from the following description, reference being made to the accompanying highly diagrammatic drawing in which:

FIG. 1 is a partial sectional view through a wall of a flue gas duct;

FIGS. 2a-2d illustrate various stud embodiments which can be used according to the invention;

FIG. 3 is a cross sectional view illustrating a screw thread assembly for tightening the stud against the wall;

SPECIFIC DESCRIPTION

The wall shown in FIG. 1 is part of a flue gas duct and comprises a wall 1 in the form of 6 millimeter thick rolled sheets of conventional structural steel which are brick welded together by a deposit weld 6.

Figure 4:
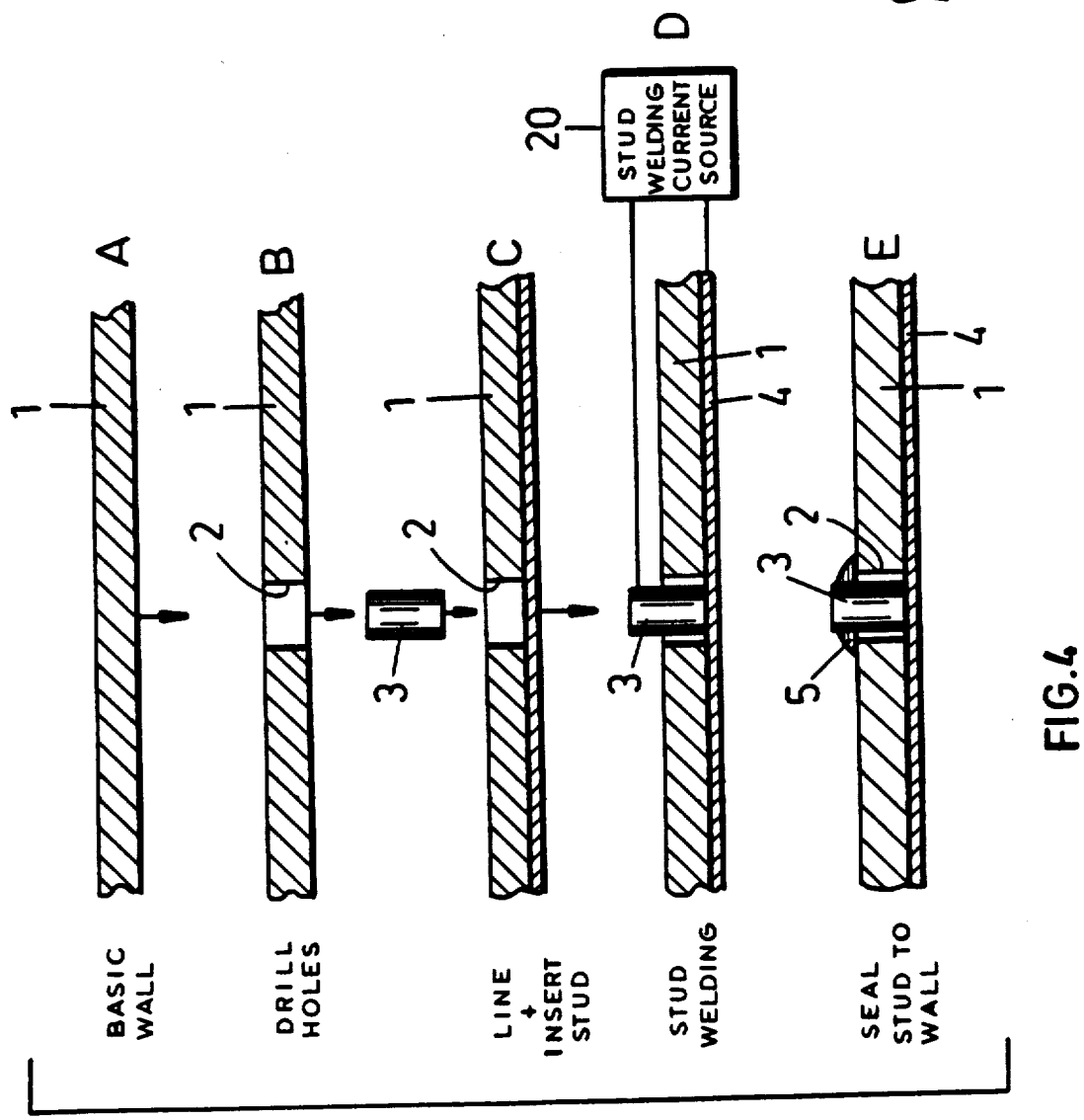
FIG. 4 is a diagram illustrating successive steps in the process of the invention.

Bores 2 are formed in the wall 1 as can be seen by a comparison of steps b and a in FIG. 4.

Studs 3 are then inserted through the bores 2 (see step c in FIG. 4) and are secured by stud welding to 2 millimeter thick sheets 4 of corrosion resistant steel which are joined together at overlapping edges 7 and 8. The stud welding is represented in step d of FIG. 4 and utilizes a stud welding current source 20 connected across the sheet 4 and the stud 3.

As can be seen from step e of FIG. 4, a gas tight seal can be formed between the wall 1 and the stud 3. That seam is a fillet weld 5 in the embodiment of FIG. 4 and, of course, the embodiment of FIG. 1.

Alternatively, the studs 3 may be formed at their outer end, referred to herein as the free ends projecting beyond the wall 1, with various means as shown in FIG. 2 for engagement with a tightening tool.

In FIG. 2a, for example, screw threads 9 are provided on the stud 3.

Figure 6:
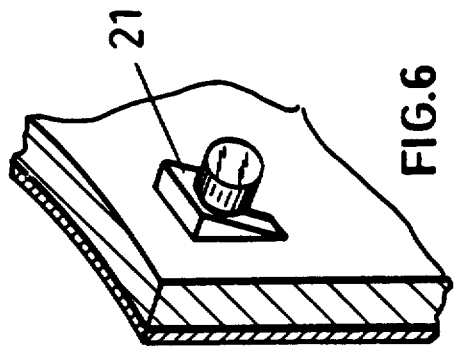
FIG. 6 is a perspective view showing the use of the stud of FIG. 2d.

In the embodiment shown in FIG. 2b, a peripheral annular groove 10 is provided and a wedge structure as shown diagrammatically at 21 and FIG. 6 may be driven into this groove to tighten the stud against the wall.

A single wedge 22 may be driven into a central opening in the stud 3 shown in FIG. 2c where that central opening is represented at 11.

Figure 5:
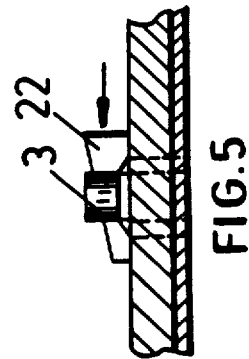
FIG. 5 is a cross sectional view showing the use of the tool with the stud of FIG. 2c.

Utilizing the tool shown in FIG. 6, the stud of FIG. 2d can be used. This stud has a pair of recesses 12 receiving the legs of the bifurcated tool 21 (FIG. 6). In the embodiments of FIGS. 5 and 6 as well, welds can be utilized to seal the opening between the bore and the stud.

In a practical embodiment of the type shown in FIG. 1, the bores 9 can be 9 millimeters in diameter and the studs 3 can be 8 millimeters in diameter. The narrow annular gap between the bore 2 and the stud 3 is sufficient to avoid an undesired welding of the studs and the wall during the stud welding process.

Reliable attachment of the sheets 4 are achieved, with the embodiments described, without the need for a ceramic ring which is often used in stud welding in order to avoid welding faults. No inert gas and no weld shielding powder is required for covering the welding region in the process of the invention.

In the embodiment shown in FIG. 3, the bore 2 is significantly larger in diameter than the stud 3. In addition, this figure shows a nut 13 threaded onto the screw thread 9 at the free end of the stud 3, a seal 14 which is pressed against the wall and the washer 15 which bears upon the seal 14 and is clamped by the nut 13 thereagainst.

The nut 13 is tightened only to the degree that the bore is sealed and relative movement between the wall 1 and sheet 4 remains possible to the extent required for compensation of thermal expansion and contraction.

It is possible in accordance with the invention to use the stud method described to secure a substructure to the wall and, in that case, the sheets 4 of corrosion resistant steel can be provided on that support structure.

We claim:

1. A method of protecting a steel wall against corrosion which comprises the steps of:
   (a) providing a corrosion-susceptible steel wall to be protected against corrosion with a plurality of bores with predetermined distances apart;
   (b) applying a plurality of corrosion-resistant steel sheets against a surface of said corrosion-susceptible steel wall on a side thereof facing a space receiving a corrosive medium and overlapping said sheets at respective edges;
   (c) inserting respective studs into each of said bores from an opposite side of said corrosion-susceptible steel wall into contact with said sheets so that said studs project away from said sheets beyond said opposite side of said wall and have free ends remote from said sheets;
   (d) stud-welding each of said studs to said sheets;
   (e) securing each of said studs gas tightly to said wall at said opposite side; and
   (f) welding the overlapping sheets together and said respective edges.

2. The method defined in claim 1 wherein said wall forms a structural steel flue-gas duct.

3. The method defined in claim 1 wherein said wall forms a structural steel flue-gas desulfurizer.

4. The method defined in claim 1 wherein substantially 1 to 10 studs are provided per square meter of said wall.

5. The method defined in claim 1 wherein said studs are composed of the same material as said sheet.

6. The method defined in claim 1 wherein said sheets are affixed to said wall in a workshop to prefabricate a wall section.

7. The method defined in claim 1 wherein said studs are formed with annular peripheral grooves at the respective free ends.

8. The method defined in claim 1 wherein said studs are formed with central openings for receiving a tightening member.

9. The method defined in claim 1 wherein said studs are formed with external recesses for receiving a tightening member.

10. The method defined in claim 1 wherein said studs are formed with screwthreads.

11. The method defined in claim 1 wherein said bores are slightly larger than said studs and said studs are joined to said wall by a gas-tight weld.

12. The method defined in claim 1 wherein said bores are larger than said studs and said studs are joined to said wall by nuts threaded onto said free ends.

13. The method defined in claim 12, further comprising interposing seals and washers between said nuts and said wall.

* * * * *